United States Patent
Fox (10) Patent No.: US 8,458,905 B2
(45) Date of Patent: Jun. 11, 2013

(54) METHOD FOR MAKING A VEHICLE COMPONENT

(75) Inventor: Bart W. Fox, Zeeland, MI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 12/964,695

(22) Filed: Dec. 9, 2010

(65) Prior Publication Data

US 2011/0139338 A1 Jun. 16, 2011

Related U.S. Application Data

(62) Division of application No. 11/886,259, filed as application No. PCT/US2006/009482 on Mar. 16, 2006, now abandoned.

(60) Provisional application No. 60/662,568, filed on Mar. 17, 2005.

(51) Int. Cl.
*B21D 53/88* (2006.01)
*B29C 45/14* (2006.01)

(52) U.S. Cl.
USPC ........... 29/897.2; 29/525.01; 29/525.14; 29/527.1; 296/146.7; 264/259; 264/261; 264/271.1

(58) Field of Classification Search
USPC ............. 29/897.2, 525.01, 525.13, 525.14, 29/527.1, 530; 296/146.7; 180/90; 264/259, 264/261, 271.1
See application file for complete search history.

(56) References Cited

U.S. PATENT DOCUMENTS

| | | | |
|---|---|---|---|
| 3,000,058 A | 9/1961 | Thielen, Jr. | |
| 5,073,318 A | 12/1991 | Rohrlach et al. | |
| 5,238,514 A * | 8/1993 | Tornero | 156/196 |
| 5,582,789 A | 12/1996 | Stein et al. | |
| 5,811,053 A | 9/1998 | Ota et al. | |
| 5,895,613 A | 4/1999 | Nakai et al. | |
| 6,447,706 B1 | 9/2002 | Savonuzzi | |
| 7,033,660 B2 * | 4/2006 | Cowelchuk et al. | 428/71 |
| 2004/0134588 A1 | 7/2004 | Gerken et al. | |

FOREIGN PATENT DOCUMENTS

| | | |
|---|---|---|
| DE | 43 16 536 A1 | 11/1994 |
| WO | WO 2004/062968 A | 7/2004 |
| WO | WO 2005/039857 A | 5/2005 |
| WO | WO 2005/068152 A | 7/2005 |

OTHER PUBLICATIONS

Chinese Office Action with English translation dated Apr. 17, 2009 in CN 200680015754.8, 11 pages.
Chinese Office Action with English translation dated Oct. 23, 2009 in CN 200680015754.8, 12 pages.

(Continued)

*Primary Examiner* — Jermie Cozart
(74) *Attorney, Agent, or Firm* — Foley & Lardner LLP (57) ABSTRACT

A process for providing a cushioned region (14) on a substrate (12) is disclosed. The substrate (12) is at least partially covered by a sheet (18) of preferably textured material. A skin (22) is coupled to the substrate (12) and a compressible material (24) (such as foam) is injected between the sheet (22) and skin (24). The sheet (18) is intended to promote adhesion to the compressible material (24) (e.g. mechanical and/or chemical joining or bonding). If portions of the coversheet (18) are exposed on a visible surface, the coversheet may also be configured to provide a decorative or ornamental appearances.

19 Claims, 9 Drawing Sheets

OTHER PUBLICATIONS

Chinese Office Action with English translation dated Apr. 19, 2010 in CN 200680015754.8, 9 pages.
Mexican Office Action dated Sep. 8, 2009 in MX/a/2007/011391, 3 pages.
Mexican Office Action dated Apr. 21, 2010 in MX/a/2007/011391, 3 pages.
Mexican Office Action dated Oct. 22, 2010 in MX/a/2007/011391, 3 pages.
Advisory Action mailed Sep. 22, 2010 in U.S. Appl. No. 11/886,259, 6 pages.
Final Office Action mailed Jun. 10, 2010 in U.S. Appl. No. 11/886,259, 7 pages.
Non-Final Office Action mailed Sep. 11, 2009 in U.S. Appl. No. 11/886,259, 6 pages.
International Preliminary Report on Patentability mailed Sep. 18, 2007 in PCT/US2006/009482, 7 pages.
International Search Report mailed Jul. 19, 2006 in PCT/US2006/009482, 3 pages.
Korean office action received in connection with Korean application No. 10-2007-7023706; dtd Feb. 27, 2013.
Translation of Korean office action received in connection with Korean application No. 10-2007-7023706; dtd Feb. 27, 2013.

* cited by examiner

METHOD FOR MAKING A VEHICLE COMPONENT

CROSS-REFERENCE TO RELATED PATENT APPLICATIONS

The present application is a divisional application of Ser. No. 11/886,259 filed Nov. 13, 2007, now abandoned which is a National Stage of International Application No. PCT/US2006/009482, filed Mar. 16, 2006, which claims priority under 35 U.S.C. § 119 to U.S. Provisional Application No. 60/662,568, filed on Mar. 17, 2005, titled "VEHICLE COMPONENT AND METHOD FOR MAKING A VEHICLE COMPONENT". The foregoing applications are incorporated by reference herein in their entirety.

BACKGROUND OF THE INVENTION

The present invention relates generally to the field of providing cushioned regions to a substrate for use in a vehicle, such as a vehicle panel.

It is known to foam in place and to partially foam in place vehicle trim panels. Such known panels include a substrate, a skin coupled to the substrate, and a foam injected between the substrate and skin. However, obtaining a bond between the substrate (typically plastic) and the foam sometimes requires treating the surface of the substrate (e.g., flame, primer, or abrading), to promote adhesion between the substrate and foam. Such treatments cost materials and labor.

Accordingly, it would be advantageous to couple a sheet to the substrate base to provide a desired ornamental appearance on one portion of the panel and provide a surface that promotes adhesion to the foam at the cushioned region. It would also be advantageous to couple the sheet to the substrate so that the sheet provides at least a portion of the visible surface (e.g., the "A" surface or side). To provide an inexpensive, reliable, and widely adaptable component for a vehicle interior that avoids the above-referenced and other problems would represent a significant advance in the art.

SUMMARY OF THE INVENTION

The present invention relates to a process for providing a cushioned region on a substrate. The substrate comprises a base that is covered by a sheet of material. The sheet of material may be coupled to the substrate base by molding the substrate against the sheet of material. A skin is coupled to the substrate and a filler material such as foam is injected between the substrate and skin. The coversheet is intended to promote adhesion to the filler material (e.g., mechanical and/or chemical joining or bonding). If portions of the coversheet are exposed on the "A" surface, the coversheet may also be configured to provide a decorative or ornamental appearance.

The present invention also relates to a method of making a cushioned region on a substrate. The method comprises coupling a sheet to at least a portion of the substrate; coupling a cover layer to the substrate; and introducing a compressible material between the sheet and the cover layer.

The present invention further relates to a panel comprising a substrate; a sheet coupled to the substrate; a cover layer coupled to the substrate; and a compressible material disposed between at least a portion of the textured layer and at least a portion of the cover layer.

Various arrangements of the substrate and cushioned region may be used. For example, the coversheet may cover the entire side or face of the substrate base (e.g., by a mold behind process) and the cushioned region is disposed over a portion of the substrate (e.g., by a partial foam in place or PFIP process). Alternatively, the coversheet may cover an entire side or face of the substrate (e.g., by a mold behind process) and the cushioned region is disposed over the entire substrate (e.g., by a foam in place or FIP process) such that the filler material is enclosed by the skin and by the coversheet coupled to the substrate. Alternatively, the coversheet covers a local area or a side or face of the substrate (e.g., by a partial mold behind or PMB process) and the cushioned region is disposed over a portion of the substrate local area (e.g., by a partial foam in place or PFIP process). Alternatively, the coversheet covers a local area of a side or face of the substrate (e.g., by a partial mold behind or PMB process) and the cushioned region is disposed over the entire local areas of the sheet/substrate laminate.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF THE PREFERRED EMBODIMENTS

Before proceeding to the description of a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for purpose of description and should not be regarded as limiting.

In general, the component or molded article described in this disclosure is a molded article having one or more localized or discrete areas or portions of softness or cushioning. In one embodiment, the molded article is configured as a trim panel for use in a vehicle (e.g., automobiles such as cars, trucks, buses, and the like; airplanes, boats, etc.). Providing a trim panel with one or more localized or discrete areas or portions of softness or cushioning enables the trim panel to selectively include areas of softness in areas that are likely to be interfaced by a passenger or other individual without the need to provide cushioning to the entire trim panel. In this manner, the areas of cushioning may be optimized based on the typical passenger experience. One advantageous feature of such a trim panel is that materials and manufacturing costs may be reduced, and the relatively inefficient practice of providing cushioning in areas that are not generally contacted by a passenger may be eliminated.

The molded article described in this disclosure may be employed in a variety of applications, and is generally applicable with any application wherein it would be beneficial to provide a molded article having one or more localized or discrete areas or portions of softness or cushioning. As mentioned above, in one embodiment, the molded article is a trim panel for use in a vehicle. Such trim panels are particularly suitable for use in an interior passenger compartment of a vehicle, and may find utility in the form of door panels, dashboards, instrument panels, consoles, sidewall trim, overhead liners, visors, or other vehicle components or portions thereof. While the disclosed embodiments may be described as a vehicle door trim panel, the features of the disclosed embodiments are equally applicable with other applications such as other panels, molded articles and components and other office, home, or educational, industrial, commercial, or consumer products which employ localized areas or regions of softness.

Figure 1:
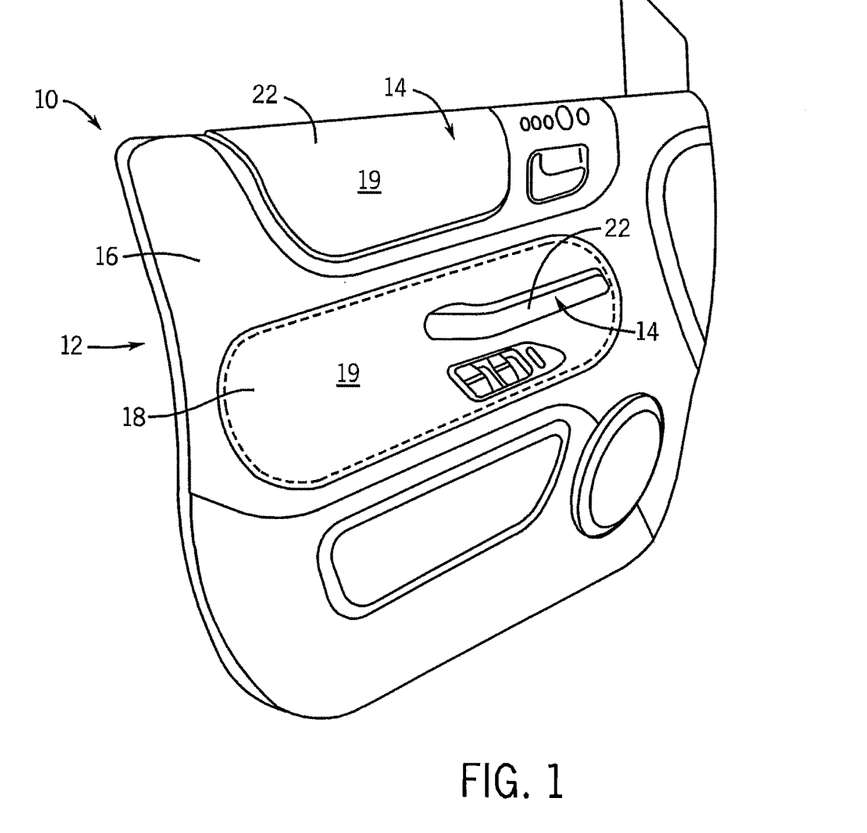
FIG. 1 is a perspective view of a vehicle door trim panel having a cushioned region coupled to a substrate base covered by a sheet of material.
Figure 2:
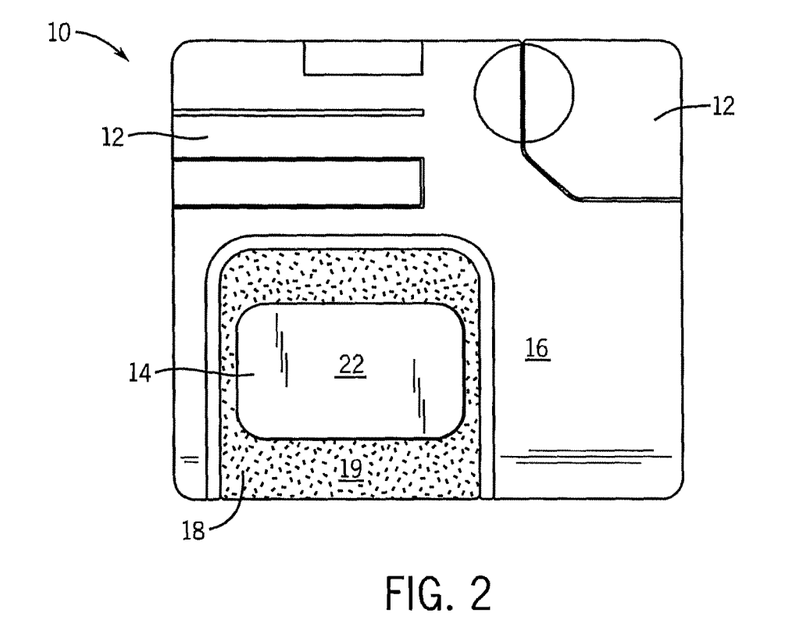
FIG. 2 is a front view of a vehicle door trim panel (the "A" surface) having a cushioned region coupled to a substrate base covered by a sheet of material along with sections molded by separate injections of plastic resin.
Figure 3:
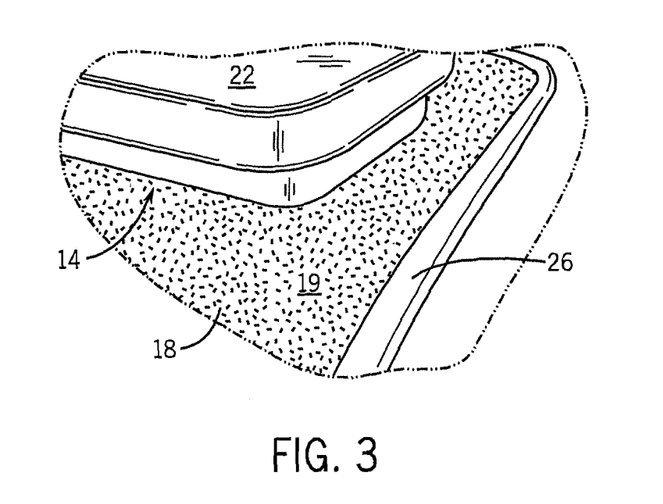
FIG. 3 is a fragmentary perspective view of the cushioned region, coversheet, and multiple plastic injected substrate of FIG. 2 substrate.
Figure 4:
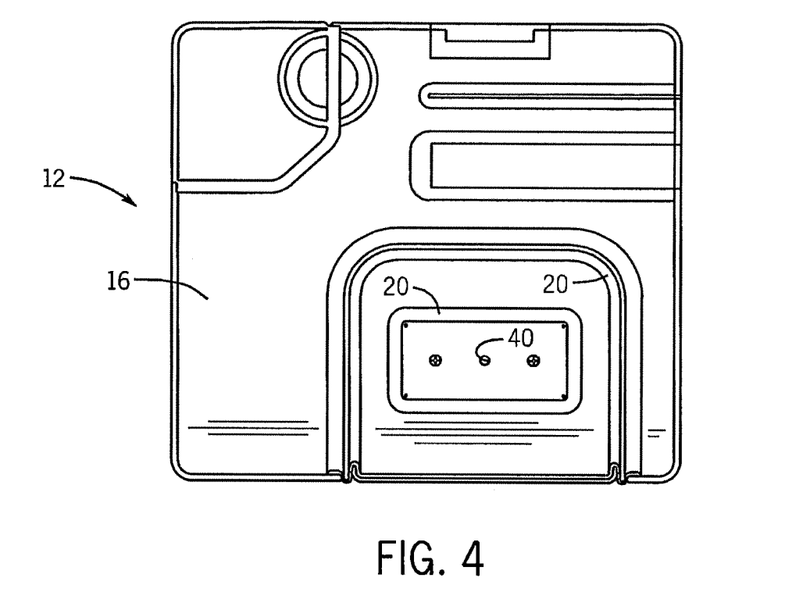
FIG. 4 is a rear view of the panel (the "B" surface) of FIG. 2.
Figure 5:
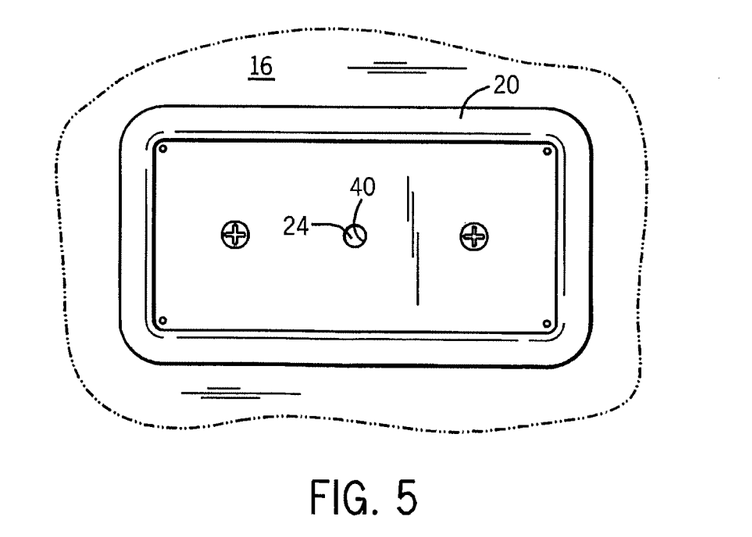
FIG. 5 is a fragmentary view of the panel of FIG. 4 with an aperture for injecting a filler material between the skin and substrate.
Figure 6:
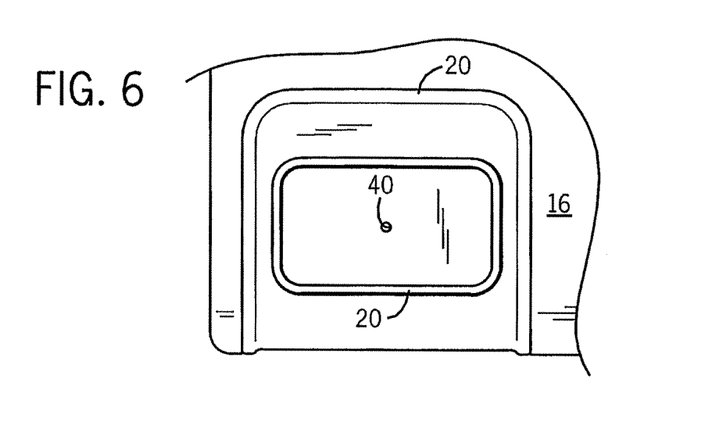
FIG. 6 is a front view of the panel of FIG. 2 before the coversheet and skin are coupled to the substrate base.
Figure 7:
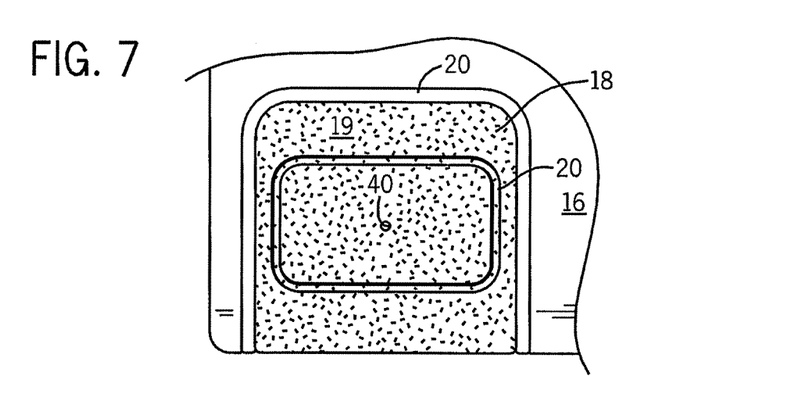
FIG. 7 is a front view of the panel of FIG. 6 after the coversheet has been coupled to the substrate base.
Figure 8:
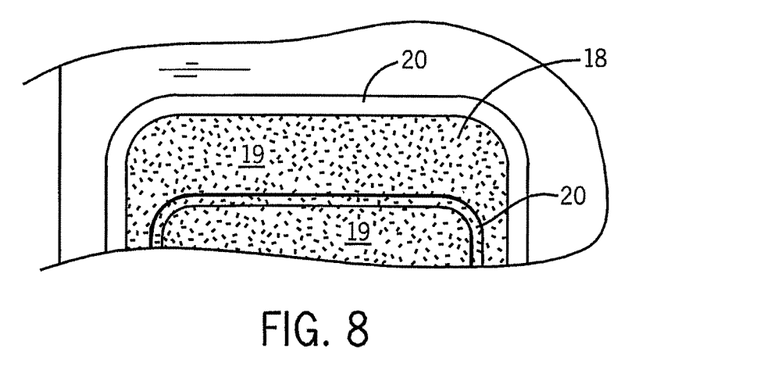
FIG. 8 is a fragmentary view of the coversheet' coupled to the substrate base of FIG. 7, illustrating the coversheet in the recesses of the substrate base.
Figure 9:
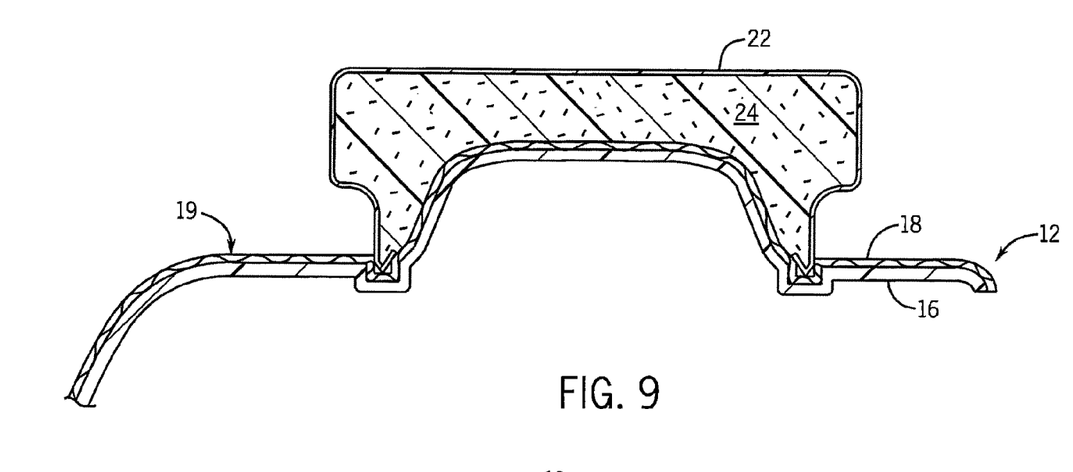
FIGS. 9-12 are schematic section views of exemplary embodiments of vehicle interior components.

Proceeding now to descriptions of the preferred and exemplary embodiments, FIG. 1 is a perspective view of a door panel 10 including a member or element in the form of a relatively rigid substrate, base, or stratum (referred to herein as a substrate 12), and a localized or discrete areas of softness or cushioning in areas or portions (shown as a relatively "padded" or "compressible" or cushioned layer or region 14) that may be contacted by a passenger or other individual. For example, the door panel 10 includes cushioned regions 14 on an armrest, adjacent a window sill, or the like, without providing cushioning in the entire door panel. Such a configuration enables areas that are not typically contacted by a passenger, shown as one or more portions, to be made of a relatively hard plastic or other material. For descriptions purposes, only a door panel will be referred to, but it is understood by a person having ordinary skill in the art that the description also applies to other applications.

Figure 18:
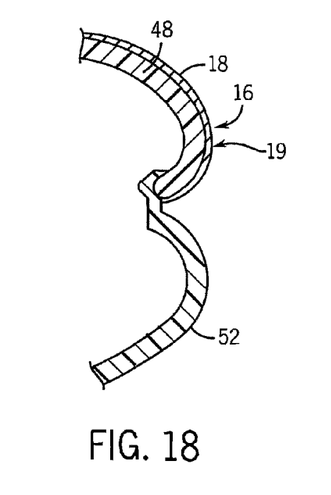
FIG. 18 shows the multi-injected substrate made from the process shown in FIGS. 15-17 before undergoing a foam-in-place or partial foam-in-place process.

The substrate 12 includes a base 16 (e.g., preferably a plastic panel or sheet) and a sheet 18 of material (e.g., coversheet, coverstock, flexible member, skin, sheet, foil, etc.) coupled to the base 16 (e.g., to form a laminate). Preferably, the sheet 18 is coupled to the base 16 in a mold behind (MB) or a partial mold behind (PMB) operation wherein molten resin that forms the base is flowed against the sheet 18 (e.g., by placing the sheet in a mold and injecting the resin) and as illustrated in FIG. 18. In a mold behind process, the sheet entirely covers a major surface of the base 16 (e.g., substantially an entire side). In a partial mold behind process, the sheet 18 partially covers a major surface of the base 16 (e.g., a local area). In a preferred partial mold behind process, edges of the sheet are embedded into the plastic by projections in one mold section pushing the edges into recesses in an opposing mold section. Alternatively, the sheet may be coupled to the base by a variety of processes including adhesive, heat staking, welding (ultrasonic, heat, etc.), fasteners (screw, staple, pin, etc.) or the like. Referring to FIGS. 4-12, the base 16 includes a recess 20 (e.g., groove, ditch, etc.) to receive portions of the coversheet and/or the skin (e.g., to disguise or hide the boundary or interface between these components).

According to a preferred embodiment, the material of sheet 18 and/or the texture of its surface 19 are selected to promote adhesion to the filler material (e.g., mechanical and/or chemical joining or bonding). For example, surface 19 of sheet 18 includes a texture (e.g., fibers, knap, hairs, voids, recesses, pits, etc.) that allow the foaming material to bond mechanically and/or chemically (e.g., fusion, welding, etc.) as it expands and/or cures. The sheet 18 is intended to have a variety of purposes, including providing a surface that may be touched by a vehicle occupant (e.g. texture, softness, etc.), the coversheet 18 may also be used to provide a decorative elements or ornamental appearances such as colors, textures, patterns (e.g., images, indicia, text, etc.), or combinations thereof that are formed, added, provided on, or otherwise disposed on the side or surface of the sheet that ultimately at least partially faces the vehicle interior (e.g., the visible surface or the "A-surface").

The cushioned region 14 generally includes an outer layer (shown as a cover layer or skin 22) and a compressible or filler material 24 (see, e.g., filler material) provided intermediate or between the skin and the substrate. An exterior surface of the trim panel (e.g., the portion visible from a passenger compartment, which is typically be referred to as the "A" surface or side, etc.) may be provided by the substrate 12, the coversheet 18, and/or the skin 22 (or portions of these).

According to a preferred embodiment, the skin 22 is provided on the substrate 12 in such a manner that a space or void (e.g., a cavity or gap) is formed intermediate or between at least a portion of the skin 22 and the substrate 12 (i.e., the coversheet 18 portion of the substrate 12). According to one exemplary embodiment, substantially all of the skin 22 away from the boundary 26 (e.g., interface, border, etc.) between the substrate 12 and the skin 22 is separated from the substrate by a space or void (e.g., to form a cavity). According to another exemplary embodiment, portions of the skin 22 may be provided in direct contact with the substrate 12, such that one or more spaces or voids are provided between the skin and the substrate in one or more particular regions. The particular design chosen may depend on any of a variety of factors, including the desired look and feel of the outer surface of the panel, materials costs, ease of manufacturing, etc.

A material (e.g., the compressible or the filler material 24) is provided or introduced (e.g., injected under pressure, gravity, etc.) into the cavity between the substrate 12 and the skin 22 to act as a filler. It is intended that such material acts as a relatively soft or cushioning material to provide the cushioned region with at least a portion of its relatively soft or cushioned characteristic. The filler material 24 may be provided into the cavity in liquid form and is subsequently expanded to fill the cavity. For example, where a foam material 24 is provided as a filler material, the foam reacts to expand and form a cellular structure within the cavity. As the filler material 24 solidifies (e.g., expands, cures, etc.), the filler material 24 bonds to the sheet 18 of the substrate 12

(chemically and/or mechanically). The sheet 18 may be provided with a variety of materials or textures that promotes bonding with the compressible material 24.

According to an exemplary embodiment, the method for introducing the filler material 24 into the cavity between the substrate 12 and the skin 22 includes inserting or providing the substrate or a portion thereof in a mold or other tooling such as a foam-in-place (FIP) or partial-foam-in-place (PFIP) tool having a clamshell configuration. The substrate 12 is provided in a mold 28 such that the "A" side or exterior surface portion faces outward (i.e., the rear portion of the substrate is in contact with the mold walls).

Figure 13:
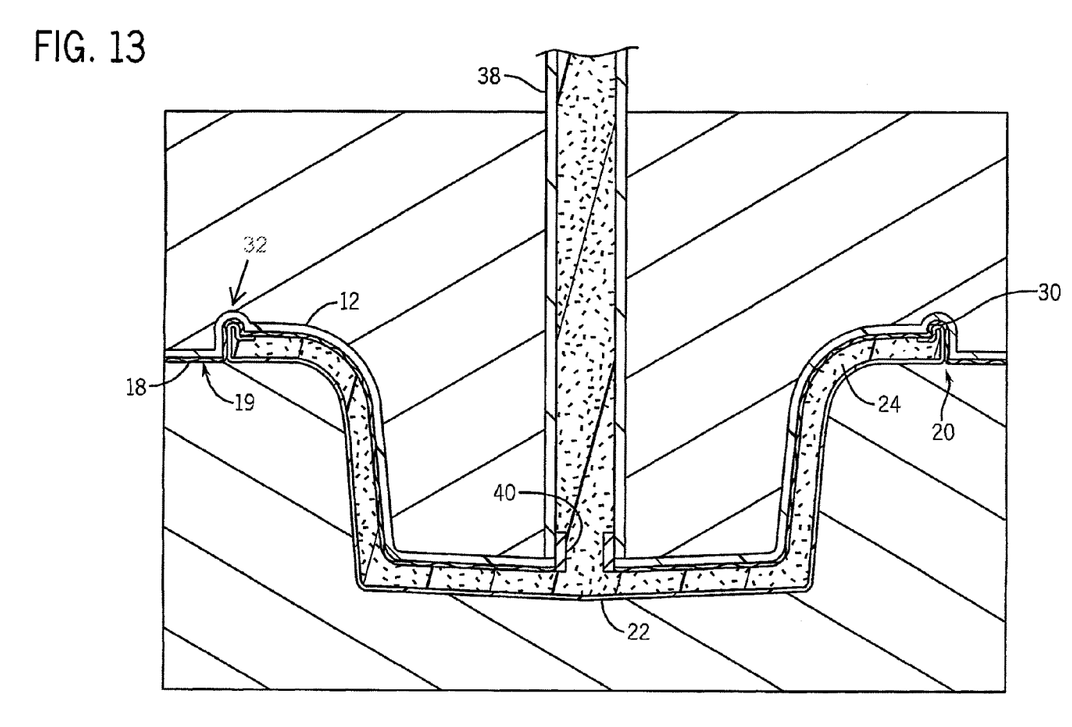
FIG. 13 is a section view of a substrate secured against a skin by closed mold sections.
Figure 14:
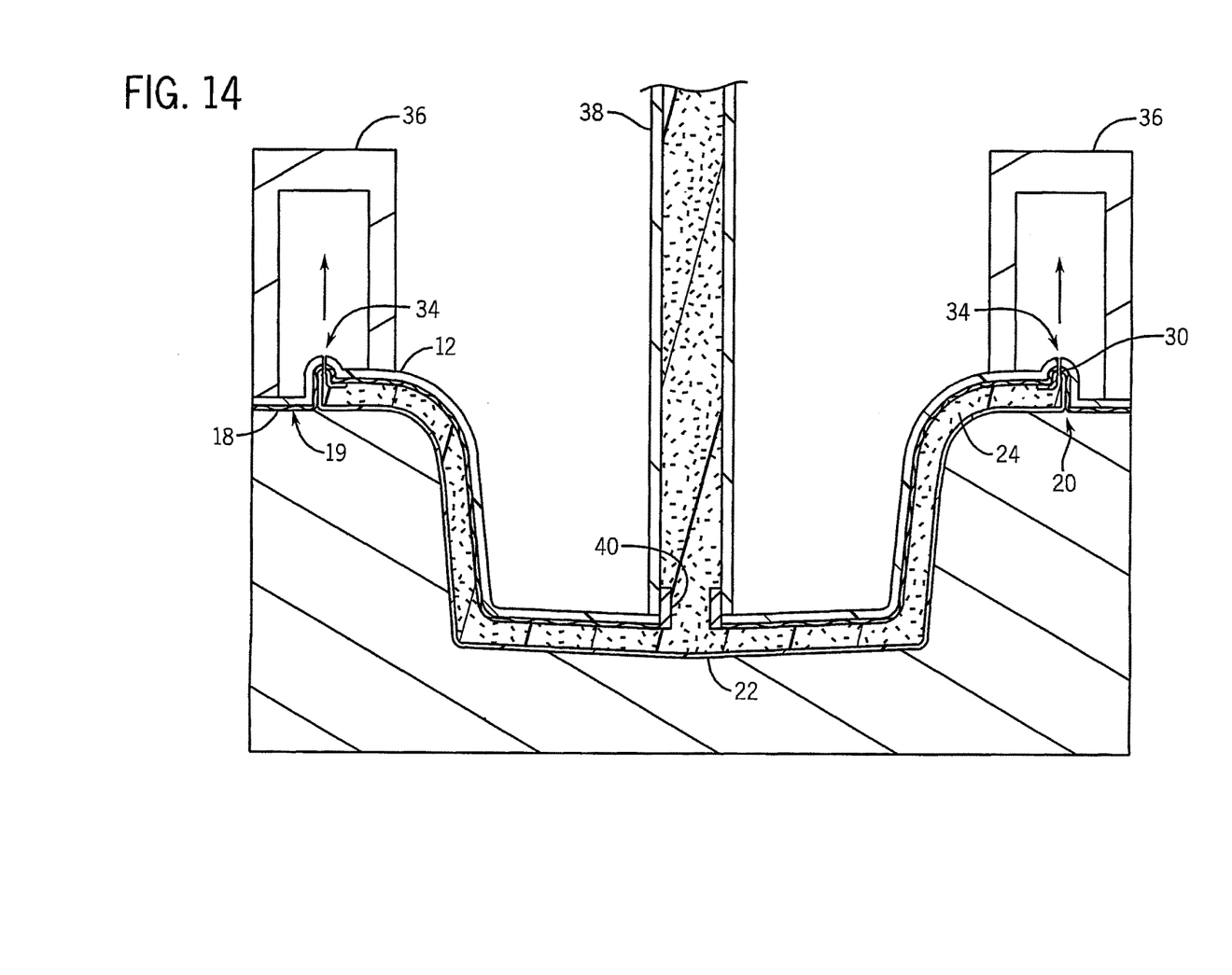
FIG. 14 is a section view of a substrate secured against a skin by a vacuum pressure.

The skin 22 is secured against or coupled to the substrate 12 in one or more locations preferably to provide a seal that contains the foam as it expands. The coupling may be accomplished by way of a mechanical interconnection (e.g., a friction or interference fit) or by other mechanisms. According to an exemplary embodiment shown in FIG. 13, the skin is secured against the substrate by a pressure or force from the mold sections closing on the substrate and skin (e.g., compression, squeezing, etc.). For example, the method may include placing the skin in one of the mold sections, placing the substrate in the mold section over the skin, and closing the mold. The skin and/or the substrate may include features configured to couple at least a portion of skin to the substrate. For example, as shown in FIG. 13 the skin 22 may be coupled to the substrate by inserting the peripheral edges of the skin formed into protrusions 30 into openings such as a recess 32 (e.g., channels or grooves) formed in the substrate to mechanically couple the skin 22 to the substrate 12. In one example, the protrusion that extends substantially entirely about the periphery of the skin and the substrate includes the channel that extends substantially entirely about the periphery of the area over which the skin is provided. The protrusion is pressed or positioned into the channel to form a seal about substantially the entire periphery of the skin to form a seal. According to an exemplary embodiment, one or both of the protrusion and the channel may extend only partially about their periphery to provide local sealing of the skin to the substrate (e.g., the skin may include a plurality of protrusions that are provided intermittently about the periphery of the skin). Various sizes, shapes, and configurations may be used for the protrusion and the channel to couple the skin to the substrate. According to other alternative embodiments, a vacuum may be drawn to secure the skin to the substrate in addition to or in place of the mechanical coupling (e.g., utilizing one or more vacuum apertures 34 formed in the substrate). In such an embodiment as shown in FIG. 14, the skin 22 is held in place by application of a vacuum that removes the air between the protrusions and the walls of the opening. A vacuum box 36 may be used to draw the vacuum, and may have a size sufficient to allow for overflow of filler material into vacuum box during manufacturing. Alternatively, one or more apertures 34 provided in the substrate for allowing the use of a vacuum may be provided in other locations in the substrate (i.e., instead of directly proximate or adjacent to a protrusion provided on the skin. According to yet another exemplary embodiment, both mechanical fastening features (e.g., interference fit protrusions(s) and channel(s)) and vacuum coupling features may be provided. According to such an embodiment, the skin includes one or more protrusions that fit into one or more openings to mechanically secure the skin to the substrate, and the substrate also includes one or more apertures to allow suction by a vacuum to secure the skin to the substrate. In any of the exemplary embodiments illustrated in the FIGURES (or in other exemplary embodiments), the protrusion 30 may provide a mechanical coupling in addition to the seal provided by the use of a vacuum or may act only as a guide to provide proper location of the skin onto the substrate. According to an alternative embodiment, the skin is coupled to the substrate by a fastener (e.g., screw, staple, pin, etc.).

Once the mold or tooling is closed and, the skin 22 is secured to the substrate 12, foam or another soft or cushioning filler material 24 is introduced (e.g., by injection, extrusion, gravity, etc.) in one or more cavities formed between or intermediate the skin 22 and the substrate 12. As the filler material 24 is injected into the space or cavity (e.g., and expanded), the filler material preferably couples to the sheet (e.g., mechanically and/or chemically). As such, the sheet promotes the bond (e.g., adhesion) between the sheet and the filler material. One or more fill tubes 38 or other devices are coupled to an aperture 40 formed in the substrate that provides an entry point into the one or more cavities provided between the skin and substrate. The filler material 24 does not escape from the cavity between the substrate skin or into the vacuum box 36 through the apertures 34 because of the seal between the skin and the substrate (e.g., by way of the vacuum and/or mechanical coupling mechanisms). Various other configurations for the engagement between the substrate and the file tube may also be utilized according to various other exemplary embodiments. The numbers, size, shape, and configuration of apertures for coupling to the fill tube (or for allowing vacuum suction) may vary according to other exemplary embodiments. For example, more than one fill tube 38 may be coupled to the substrate in various locations, and more than one aperture may be provided for coupling to such fill tubes. The various features of the apertures may be optimized according to various considerations, including manufacturability, cost, and other considerations. One or more vent holes may also be provided in the substrate to reduce the amount of carbon dioxide or other gas accumulating within the component during the filling operation.

FIG. 9-12 show various embodiments for the substrate 12, sheet 18, skin 22, foam component (filler material 24). According to a first exemplary embodiment shown in FIG. 9, the sheet 18 covers an entire side or face of the substrate (e.g., by a mold behind process) and the cushioned region 14 is disposed over a portion of the sheet/substrate laminate (e.g., by a partial foam in place or PFIP process).

Figure 10:
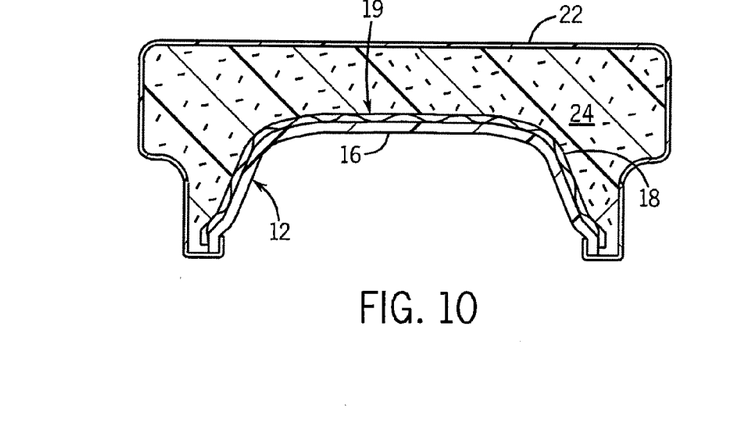

According to a second exemplary embodiment shown in FIG. 10, the sheet 18 covers an entire side or face of the substrate 12 (e.g., by a mold behind process) and the cushioned region 14 is disposed over the entire sheet/substrate laminate (e.g., by a foam in place or FIP process) such that the filler material 24 is enclosed by the skin 22 and by the sheet 18 coupled to the substrate 12.

Figure 11:
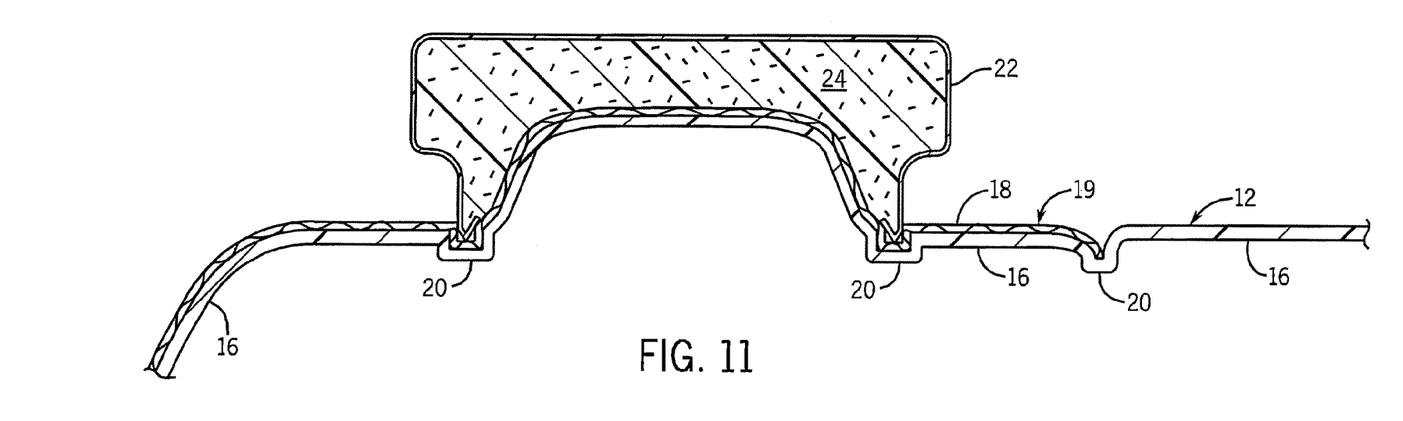

According to a third exemplary embodiment shown in FIG. 11, the sheet 18 covers a local area or a side or face of the substrate 12 (e.g., by a partial mold behind or PMB process) and the cushioned region 14 is disposed over a portion of the sheet/substrate local area laminate (e.g., by a partial foam in place or PFIP process).

Figure 12:
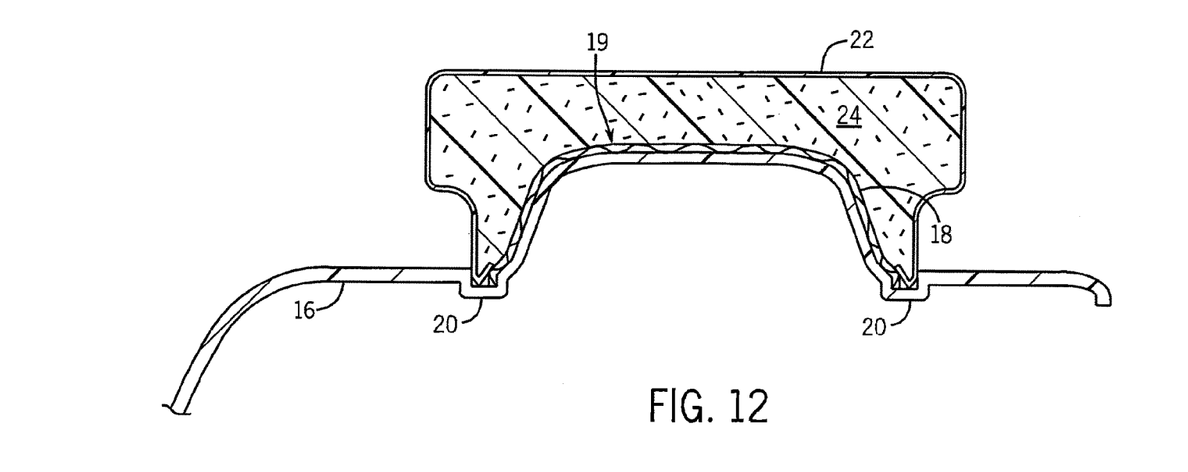

According to a fourth exemplary embodiment shown in FIG. 12, the sheet 18 covers a local area of a side or face of the substrate 12 (e.g., by a partial mold behind or PMB process) and the cushioned region 14 is disposed over the entire local areas of the sheet/substrate laminate.

The component comprising the skin 22, substrate 12, and foam 24 is then removed from the mold or tooling. The skin 22 is coupled to the substrate 12 by mechanical means (e.g., protrusion and opening coupling) and/or by the interaction and/or bonding between the filler material 24, and the cover-sheet 18 on the substrate 12. For example, a bond may be formed between the sheet 18 and foam 24 provided in a cavity. According to an alternative embodiment, an adhesive may be provided on one or both of the substrate 12 and coversheet 18 and the skin 22 on the interior of the cavity to bond the foam thereto.

Various process steps may also be utilized in addition to or in place of those described above. For example, it may be necessary to seal or close one or more apertures provided in the substrate subsequent to the filling operation (e.g., to prevent foam or filler material from escaping). In another example, the mold may be rotated after inserting the skin and substrate into the mold and closing the mold prior to filling the cavity or cavities with filler material.

The methods of providing localized areas or regions of softness or cushioning in a manner described herein may be utilized to provide molded articles having a wide variety of configurations. For example, the door panel may be provided with one or more portions (e.g., areas, regions, islands, etc.) of hard plastic (e.g., bezels, accents, appliqués, pull cups, etc.). In another example, the door panel may be formed with complex geometries. In yet another example, the door panel may include proud (e.g., raised) or recessed regions of cushioning for enhanced aesthetics.

According to a preferred embodiment, the substrate may be made of any suitable material, including any of a variety of metals (e.g., aluminum, magnesium, metal alloys, etc.) or polymers (e.g., polypropylene, polyethylene, copolymers, etc.). Any of a variety of materials can be used, including polymers such as thermoplastics, thermosets, elastomers, and the like. For example, any variety of thermoplastic resins such as polypropylene, polyethylene, high density polyethylene, acrylonitrile butadiene styrene ("ABS"), polycarbonate, vinyl, polyester, polyurethane, thermoplastic elastomer (TPE), thermoplastic elastomer polyolefin (TPO), thermoplastic vulcanizate (TPV), polyvinyl chloride (PVC), nylon, any of a variety of homopolymer plastics, copolymer plastics, plastics with special additives, filled plastics, or the like may be used. Also, any of a variety of thermoset resin such as phenolics, thermosetting polyester, silicone, polyurethane elastomers, or the like may be used. Further, any of a variety of elastomer resins such as rubber, butyl, synthetic elastomer (SBR), or the like may be used.

The substrate may be formed in any of a wide variety of shapes, sizes, and configurations, and may include a variety of other features not shown in the FIGURES (e.g., apertures for door locks and handles, molded-in designs, etc.). The substrate may be a stand-alone component or may be a component in a larger assembly (e.g., the substrate may be an entire door panel or may be a portion thereof, etc.).

According to one embodiment, the substrate is formed of a single material as a single injection. In another embodiment, the substrate may be formed by a process that allows for multiple materials to be allocated at different portions of the substrate. According to an exemplary embodiment, the process for making such a substrate includes multiple injections into a mold that is reconfigured during the molding operation. It is important to note that the terms "multi-color," "multi-material," "multiple colors," "multi-shot," and "different" polymers (or "plastics," "polymeric materials," "polymeric resins" and the like) as used herein are intended to be broad terms and not terms of limitation. The particular materials used to construct the exemplary embodiments are also illustrative. The resins may be different colors of the same polymer, different polymers that have the same color, different polymers that have different colors, and the like. There may be one, two, three, or more polymers that are co-molded or sequentially molded. The molding operation is preferably injection molding; but any of a variety of molding operations may be used such as reaction injection molding (RIM), transfer molding or the like.

Figure 15:
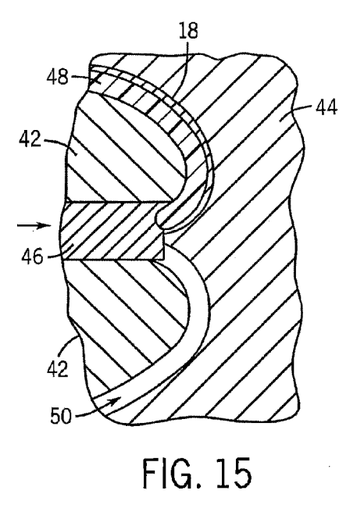
FIGS. 15-17 show schematic views of a process for molding a multi-injection substrate base with a coversheet.
Figure 16:
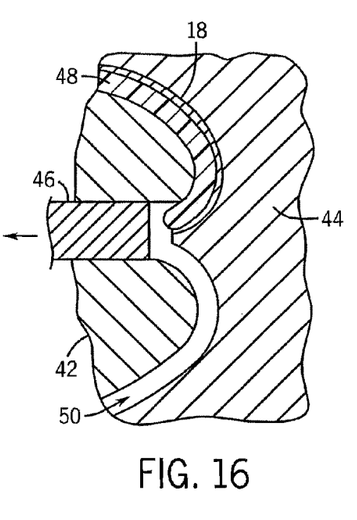
Figure 17:
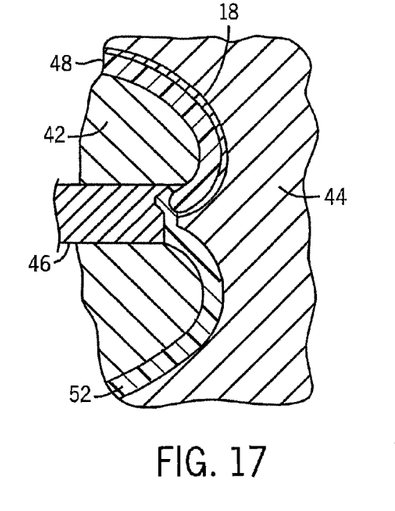

Referring to FIGS. 15-17, to produce a one-piece, multi-color/multi-material trim panel (such as shown in FIGS. 2-4, 6, 7, and 18), the process includes providing a core 42, a cavity 44, and a mold member configured to be moved or retracted (referred to herein as a retractor 46). A first "shot" of polymeric resin material 48 (representative of a first portion of the trim panel 10) is constrained within the mold corresponding to a particular region on trim panel by a first cavity defined by the retractor 46, core 42, and cavity 44. Once the first cavity is filled with polymeric resin, the retractor 46 is displaced (preferably by approximately the thickness of the part) to provide a second cavity 50 defined by the displaced retractor 46, cavity 44, core 42, and the first polymeric resin 48. The second "shot" of polymeric material 52 (representative of a second portion of the trim panel) then fills the second cavity 50 with polymeric resin that flows to and bonds with the first material 48 along the boundary.

The sheet coupled to the substrate is preferably made from textile (woven, non-woven, knit, etc.), but can be made from any of a variety of materials and compositions including fabric, cloth, natural material (e.g., leather, etc.), polymer (e.g., thermoplastic elastomer polyolefin (TPO), vinyl, or materials formed by reaction injection molding (RIM), etc.), elastomer, or the like or combinations thereof; and may have multiple layers (e.g., outer, inner, scrim, etc.).

According to an exemplary embodiment, the skin is made of a relatively soft or flexible material comprising a polymeric material (e.g., polyurethane, polyvinylchloride (PVC), a thermoplastic olefin (TPO), etc.). According to other exemplary embodiments, the skin may be made of other materials, including woven or non-woven textiles such as cloth, fabric leather, composite materials, layered materials (e.g., a layer of leather applied above a polymeric material layer), etc.

According to an exemplary embodiment, the skin is manufactured or produced utilizing a slush molding process. In a slush molding process, a thermoplastic material in a liquid or powdered form is introduced into a temperature-controlled mold to form a viscous skin adjacent to the mold walls. Once the skin is formed, the excess material is removed from the mold and the skin is allowed to cure and cool, after which the skin is removed from the mold. One advantage of utilizing a slush molding process is that it is relatively inexpensive and efficient in producing relatively complex skin geometries.

According to another exemplary embodiment, the skin is manufactured or produced utilizing a vacuum forming process. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls.

According to other exemplary embodiments, the skin may be manufactured according to various other methods. For example, the skin may be formed in an injection molding process, reaction injection molding (RIM) process, an extrusion process, a casting process (e.g., gravity casting), slush molded, vacuum molded, sprayed or brushed (e.g., urethane skins), or any other suitable process for forming a polymeric skin.

According to a preferred embodiment, the filler material is a polymeric material such as a foam material (e.g., a urethane foam), an elastomer, rubber, butyl, or the like, or combination thereof.

It should be noted that according to various exemplary embodiments, all or a part of the substrate may have a cushioned or padded portion provided adjacent thereto. For example, according to an exemplary embodiment, a skin is applied adjacent a substrate, and portions of the skin may be in direct contact with the substrate, while other portions of the skin may be separated from the substrate by a filler material. In this manner, localized regions of cushioning may be provided while retaining the look and feel of the skin even in those regions not provided with cushioning.

It is also important to note that the construction and arrangement of the elements of the vehicle components as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, any of a variety of sheets with any of a variety of "textures" or bondable surfaces may be used to promote bonding (mechanical coupling) between the foam and the substrate. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of forming a vehicle trim panel having a cushioned region comprising:
   providing a sheet having a textured surface;
   coupling a base to a surface of the sheet opposite the textured surface to form a substrate;
   coupling a flexible cover layer to the substrate;
   introducing a compressible material between at least a portion of the cover layer and at least a portion of the surface of the sheet having the textured surface so that the compressible material mechanically bonds to the textured surface of the sheet, the compressible material being introduced after the base is coupled to the sheet; and
   defining an exterior surface of the panel with at least a portion of the textured surface of the sheet, a portion of the base, and a portion of the cover layer.

2. The method of claim 1 wherein the step of coupling the cover layer to the substrate comprises retaining perimeter portions of the cover layer in a recess formed in the substrate.

3. The method of claim 2 further comprising a providing a mechanical interconnection between the cover layer and the substrate at the recess to retain the perimeter portions of the cover layer.

4. The method of claim 3 further comprising using the mechanical interconnection to form a seal against the introduction of the compressible material.

5. The method of claim 4 further comprising providing the seal in a substantially continuous manner about the perimeter portions of the cover layer.

6. The method of claim 1 wherein the step of coupling the base to the sheet comprises sizing the base to substantially cover the entire surface of the sheet opposite the textured surface.

7. The method of claim 1 wherein the step of coupling the cover layer to the substrate comprises retaining the cover layer by at least one of mold sections, vacuum pressure, fasteners, or interference fittings.

8. The method of claim 1 wherein the step of coupling the cover layer to the substrate comprises providing a cavity between the surface of the sheet having the textured surface and the cover layer.

9. The method of claim 8 wherein the step of introducing the compressible material comprises injecting a foam material into the cavity and expanding the foam material.

10. The method of claim 1 wherein the step of coupling the cover layer to the substrate comprises directly coupling the cover layer to the textured surface of the sheet.

11. The method of claim 1 wherein the step of coupling the base to the sheet comprises directly coupling the base to the surface of the sheet opposite the textured surface.

12. The method of claim 1 wherein the step of coupling the base to the sheet comprises injection molding the base against the sheet.

13. The method of claim 1 wherein the step of coupling the base to the sheet comprises applying an adhesive to one of the base and the sheet.

14. The method of claim 1 wherein the step of coupling the base to the sheet comprises heat staking the base to the sheet.

15. The method of claim 1 wherein the step of coupling the base to the sheet comprises welding the base to the sheet.

16. The method of claim 1 wherein the step of coupling the base to the sheet comprises using one or more mechanical fasteners to attach the base to the sheet.

17. The method of claim 1 wherein the vehicle trim panel is one of a door trim panel, an instrument panel, a visor, and a headliner.

18. The method of claim 17 wherein the cover layer and the compressible material provide the cushioned region of an armrest on the door trim panel.

19. A method of forming a vehicle trim panel having a cushioned region comprising:
   providing a sheet having a textured surface;
   coupling a base to a surface of the sheet opposite the textured surface to form a substrate;
   coupling a flexible cover layer to the substrate to form a void therebetween;
   inserting a liquid filler material into the void, wherein the filler material is configured to solidify to form a compressible material between the cover layer and the sheet, the filler material also being configured to bond with the textured surface during solidification; and
   defining an exterior surface of the panel with at least a portion of the cover layer.

* * * * *